United States Patent

Varner

[15] 3,674,079
[45] July 4, 1972

[54] METHOD FOR PRODUCING ENDLESS REINFORCEMENTS FOR VULCANIZED PNEUMATIC TIRES

[72] Inventor: George C. Varner, Spartanburg, S.C.
[73] Assignee: Deering Milliken Research Corporation, Spartanburg, S.C.
[22] Filed: Oct. 23, 1970
[21] Appl. No.: 83,294

Related U.S. Application Data

[62] Division of Ser. No. 812,766, April 2, 1969, Pat. No. 3,589,426.

[52] U.S. Cl. ............................. 152/361, 156/123, 156/128, 156/133, 264/326
[51] Int. Cl. ................. B29h 17/02, B29h 17/08, B60c 5/08
[58] Field of Search .................. 152/361; 156/128, 123, 133; 264/326

[56] References Cited

UNITED STATES PATENTS

| 3,205,931 | 9/1965 | Keefe, Jr. | 152/361 |
| 3,231,000 | 1/1966 | Massoubre | 152/361 |

*Primary Examiner*—Robert F. Burnett
*Assistant Examiner*—C. B. Cosby
*Attorney*—Norman C. Armitage et al.

[57] ABSTRACT

The endless reinforcement for a pneumatic tire of the present invention comprises continuous cord forming a generally zig-zag pattern and being positioned across the width of the reinforcement from one side to the other at an angle to the edges of the reinforcement with reversals at the edges. Lengths of the cord between the reversals are interleaved with lengths disposed in an opposite direction along at least one line substantially parallel to and intermediate the edges thereof. Also, a method for producing a tire including such reinforcement and the resulting tire.

5 Claims, 4 Drawing Figures

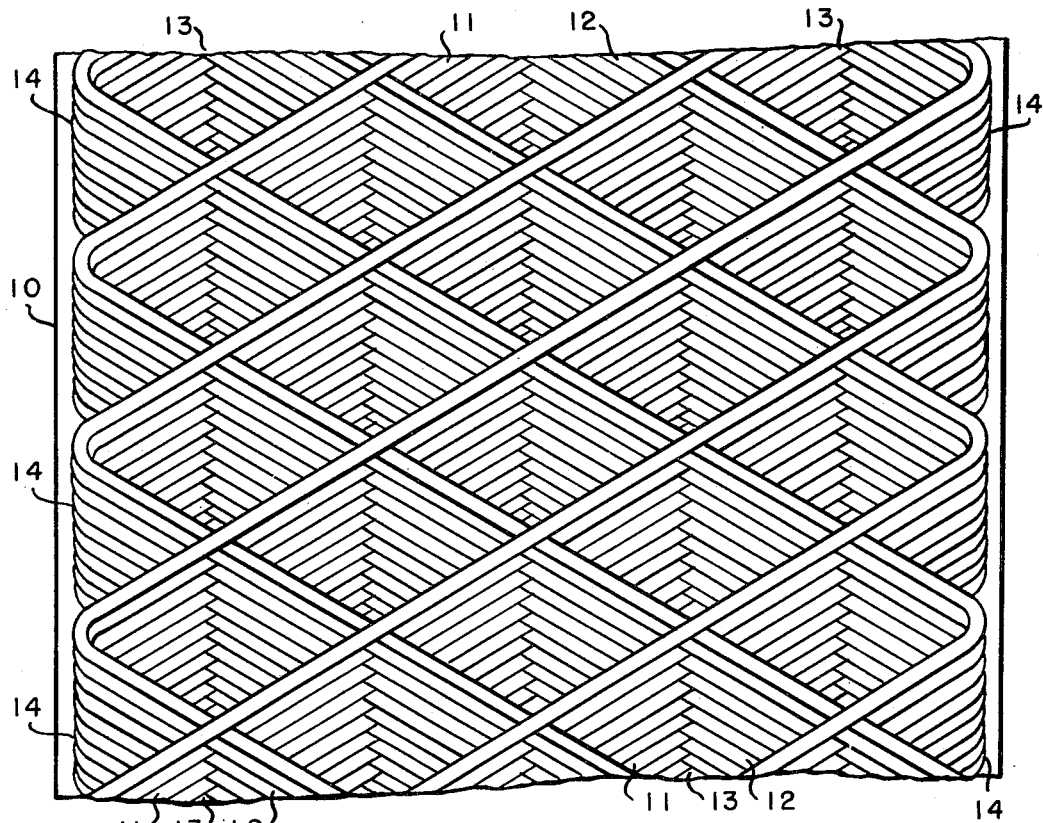
FIG.-1-
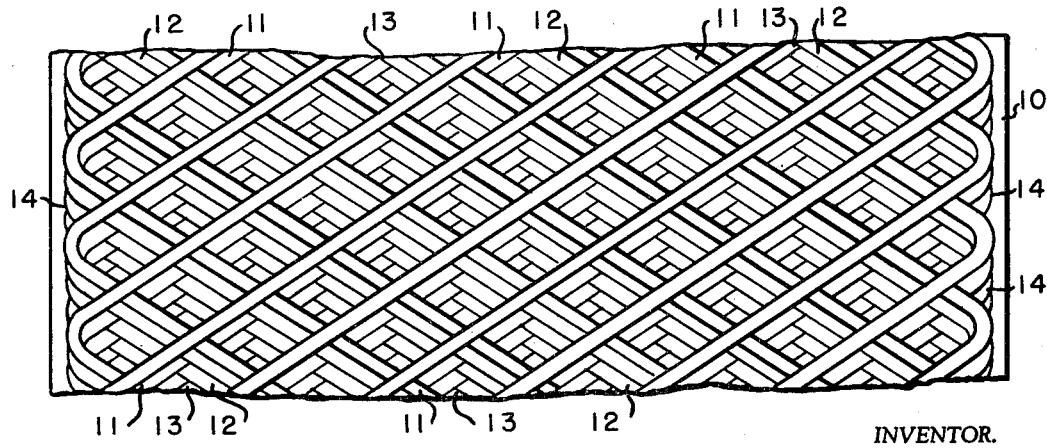
FIG.-2-
INVENTOR.
GEORGE C. VARNER
ATTORNEY 3,674,079
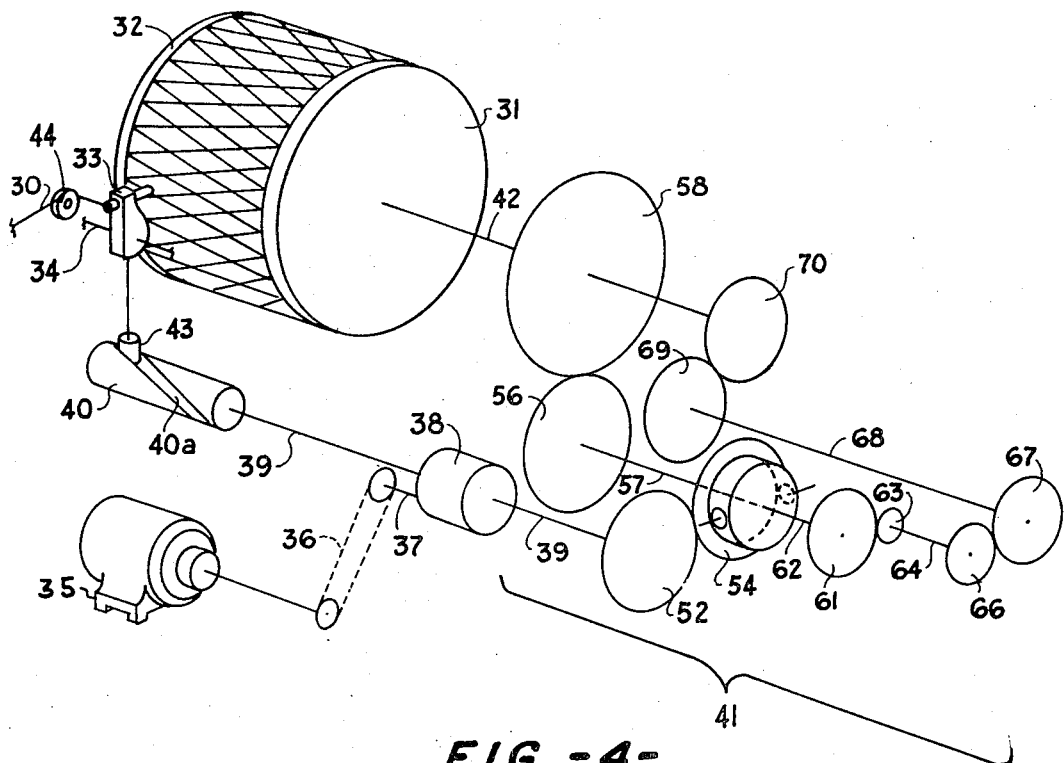
FIG.-4-
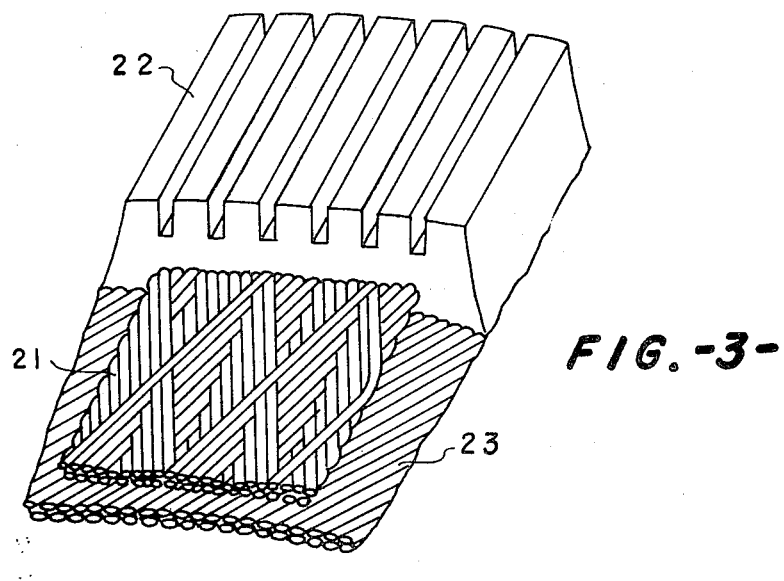
FIG.-3-
INVENTOR
GEORGE C. VARNER
ATTORNEY

METHOD FOR PRODUCING ENDLESS REINFORCEMENTS FOR VULCANIZED PNEUMATIC TIRES

This is a division of application Ser. No. 812,766, filed Apr. 2, 1969, now U.S. Pat. No. 3,589,426 patented June 29, 1971.

The tire industry in the United States recently has developed considerable interest in so-called belted tires. While tread reinforcing belts or breaker strips have been utilized for some time with radial tires, such tires have not gained general acceptance in the United States because of the harsh riding qualities which are encountered with U. S. automobiles using such tires. More recently, with the emphasis on automotive safety, interest has developed to modify belted tires to suit U. S. cars. Belted tires which have been produced commercially in the U. S. to date utilize strips of bias cut woven fabric which are wrapped around the tire carcass and spliced together prior to the application of the sidewall and tread-forming rubber stock to the carcass. Such breaker strips generally have been made from fiber glass cords or metal wires. With both of these materials, a serious problem is encountered because of the great number of cut ends at each edge of the strip. Another problem is the inherent imbalance of such tires due to the splice in the strip.

It has been proposed in patent literature to utilize various types of belts made by winding a single cord in a zigzag fashion over the periphery of a drum. One such method is described in Vanzo Pat. No. 2,982,327. As set forth in the patent, the cord passes along a zigzag path from one edge of the breaker strip to the other and back to the first edge at an angle to the edges. The path of the cord is controlled during each revolution of the drum so the cord is laid adjacent to the previously positioned cord. A formula is given in the patent to determine the angle of the cord as it is laid in the zigzag pattern. It is apparent from this formula that the number of cycles of the cord from one edge to the other and back in a single revolution must be a whole number plus a small increment so that the cord will be laid in proper position adjacent to other cord. However, this factor can create serious limitations in the design of the belt structure by restricting possible variations and combinations of particular circumference, width and cord angles.

Another feature of the breaker strip of the Vanzo patent is the two separate and distinct plies or layers throughout its circumference. This relationship is illustrated particularly in FIG. 6 of the drawings of the patent which shows the folding of a strip of parallel cords to form a breaker with a zigzag cord pattern. This two-ply construction permits one ply to move independently of the adjacent ply which may create undesirable shear planes in the final tire.

French Pat. No. 1,268,334 proposes a method for producing reinforcements for tires which provides more flexibility in the various parameters of the belt by changing the gear ratio so that the cords will be interwoven. While the method proposed in French Pat. No. 1,168,334 provides a greater degree of flexibility in the production of reinforcements, a major drawback of the French patent is that the method described therein does not provide for the translation of any particular belt construction to a belt of different dimensions or different parameters. Thus, for example, if a successful belt produced according to the method of the French patent has a particular cord spacing and/or is of a configuration in which the portion of the cord laid between one edge and the opposite edge has a certain number of intersecting lines with cords laid in opposite complementary directions, it is not possible to reproduce this belt changing only slightly the width and/or the diameter and still be assured of substantially the same cord spacing and/or the same number of intersecting lines, except by trial and error building of many belts. Since the number of possible combinations of the various parameters proposed in the French patent are in the tens of thousands, it is apparent that the teachings of the French patent do not provide for the translation of the parameters and reproduction of a belt with the same characteristics for different tire sizes or dimensions. As a result, a tire manufacturer following the teachings of the French patent would not be able to produce the same belt design for each of his different production tire sizes without conducting a great number of belt building experiments, and even after such experiments, there would be no assurance that the same belt would be produced unless all of the possible combinations were explored and belts constructed.

In accordance with the present invention, a novel method for the production of reinforcements for pneumatic tires provides advantages over the prior art. The method of the invention provides a direct means for producing a particular belt in a number of different dimensions simply and conveniently and without resorting to trial and error belt building. Furthermore, the method of the invention provides a convenient means for duplicating a particular belt construction with a degree of accuracy beyond that observable to the human eye.

The endless reinforcement for a pneumatic tire of the present invention comprises continuous cord forming a generally zigzag pattern and being positioned across the width of the reinforcement from one side to the other at an angle to the edges of the reinforcement with reversals at the edges. Lengths of the cord between the reversals are interleaved with lengths disposed in an opposite direction along at least one line substantially parallel to and intermediate the edges thereof. The relationship of the various parameters of the reinforcement is as follows:

$$\frac{C \cdot \tan A}{2 \cdot W} = \frac{EPI \cdot C \cdot D \cdot \sin A}{P \cdot M \pm 1} = GR$$

wherein $C$ is the circumference of the reinforcement, $A$ is the smaller angle between the cord and the edge of the reinforcement, $W$ is the width of the reinforcement measured perpendicular to the edges, $EPI$ is the number of cords per inch measured perpendicular to the cord lengths, $P$ is an integer and equal to one plus the total number of interleaving lines parallel to and intermediate the edges of the reinforcement, $M$ and $D$ are two integers having no common factor and which render $(P \cdot M \pm 1)/D$ an integer with $D$ being less than $P$, and $D$ and $P$ have no common factor, $GR$ is the number of repeating cycles of the cord from one edge and back to the same edge for each circumference of the reinforcement.

In the formation of an endless reinforcement of the invention it is customary to pre-select the circumference, width, cord angle and cord spacing within close tolerances. Likewise, it generally is advantageous to pre-select the number of interleaving lines or $P$ which is one plus the total interleaving lines. If the number of interleaving lines is not critical, a range for $P$ can be selected. By satisfying the above equation, the gear ratio or number of cord cycles per circumference is determined.

In the translation of the parameters of an endless reinforcement to one of a different size, it often is important that the structural appearance and configuration of the reinforcement be the same. This is accomplished in accordance with the present invention by changing the parameters, other than the value of $P$, so that satisfying the above equation will result in the determination of an applicable gear ratio. While the gear ratio may be considerably different from one reinforcement to another, the structure and physical characteristics of the reinforcements will be the same. The number of interleaving lines will be identical and the angle and ends per inch will be the same within close tolerances even though the width and/or the circumference are different. Thus, the method of forming endless reinforcements for pneumatic tires in accordance with the invention provides convenient means for producing reinforcements having the same structure for different tire sizes.

The endless reinforcement of the invention usually is of a generally cylindrical form or configuration and is made from conventional tire cord material such as fiber glass, rayon, polyester, nylon, cotton, metal wire and similar-type cords. The dimensions may be varied over a considerable range depending upon the ultimate use thereof. For example, with reinforcements which are to be applied to tire carcasses in flat band form, the circumference will be considerably smaller than the final circumference in the finished tire. Likewise, the original width will be substantially larger than the final width. This is due to the fact that generally during the expansion step in the forming of the tire the circumference of the reinforcement will be substantially increased and the width will be significantly reduced. During this expansion the angle of the cord across the width from one side to the other as measured from the edge usually will be reduced to a substantial degree. With reinforcements which are applied to a carcass that has already been formed into the shape of a torus, i.e., a doughnut shape similar to that of the final tire, the dimensions will be substantially the same in its original form as applied to the carcass and in its final size in the finished tire.

The reinforcement preferably is formed from a minimum number of cords so that the number of cut ends will be negligible. Ideally, the complete reinforcement is formed from a single cord which forms the generally zigzag pattern. In this case, the two ends of the single cord are the only cut ends in the reinforcement. Under some conditions, it may be desirable to form the reinforcement from several cords simultaneously with each of the cords being in the same zigzag pattern and being positioned similarly to the single cord but displaced therefrom. This may facilitate the production of a reinforcement in a short period of time. In either situation, it is apparent that the reinforcement of the invention is an endless strip thus eliminating splices which can lead to imbalance and possible premature failure of a tire.

The cord in the zigzag pattern is positioned across the width of the reinforcement from one side to the other at an angle to the edges. In a reinforcement intended to be expanded, the initial angle of the cord advantageously is in the range of about 45° to 80° and preferably about 50° to 70° as measured from an edge. During expansion of such a reinforcement, the angle of the cord usually will be reduced to an angle in the range of about 5° to 35°. With a reinforcement which is applied to a carcass after the carcass has been expanded, the angle of the cord generally is in the range of about 10° to 35°, that is, about the same angle as the final cord angle of an expanded reinforcement. It may be desirable with certain reinforcement constructions to provide a change in the angle of the cord across the width thereof. Thus, the angle of the cord in the portions thereof adjacent to the edges may be greater or less than the angle of the cord in the center portion. Such a construction may be advantageous where different reinforcement expansion characteristics are desired for particular shapes or types of tires.

As pointed out above, in the reinforcement according to the invention, there is a reversal of the cord at the edges. Upon reversal of the cord, the succeeding length of cord is positioned in the zigzag pattern at approximately the same angle with respect to one edge as the previous length of cord prior to the reversal is with respect to the opposite edge. This provides a symmetrical cord position in the final construction and minimizes the possibility of imbalance in the tire.

The edges of the reinforcement of the invention may be distorted by providing cord reversals at points staggered with respect to other reversal points. Thus, the point of reversal for a given length of cord may be closer to the center than normal or farther away as desired. Such staggering of the reversal points provides a reinforcement with edges somewhat thinner than the main body of the reinforcement.

Lengths of cord between reversals in the reinforcement of the invention are interleaved with lengths disposed at an opposite angle. This interleaving of the cord is along a line or zone substantially parallel to and intermediate the edges as set forth above. Advantageously, the interleaving results in at least two portions of a length of the cord being disposed on the outside of the reinforcement and at least two portions thereof being disposed on the inside with alternate portions on the outside and the inside along the length. Preferably, a single length has between about 2 and 250 portions disposed on the outside of the reinforcement with a like number of portions being disposed on the inside thereof. The degree or extent of interleaving along a particular length will determine the number of interleaving lines or zones intermediate the edges. It is believed that increasing the number of interleaving lines facilitates the uniformity of expansion and increases the flexibility of a reinforcement to accommodate differences in carcass dimensions.

As the number of portions increases, the lines or zones of interleaving may become less readily visible due to the overall black color of the rubber coated cord and/or the interleaving pattern. This may also occur when several cords are employed together in the formation of the reinforcement as pointed out above. However, in any case the pattern, i.e., the particular number of lines or zones, is a factor in the formation of the reinforcement. Thus, for a particular reinforcement pattern, P in the formula on page 4 of the specification will be the same. If the number of interleaving lines is not apparent visually for a particular reinforcement pattern, the formula on page 4 of the specification can be used to determine P. With the determination of P, the same reinforcement pattern can be constructed for a reinforcement having different dimensions, for example, circumference, angle, width, etc. Summarizing, the invention of the present application and the mathematical formula thereof are utilized whether or not the interleaving lines are apparent visually.

It is advantageous that cord be covered with rubber or plastic prior to being formed into the generally zigzag pattern. This covering is particularly important when the cord is of a material which is easily abraded or degraded by rubbing contact, for example, fiber glass. Preferably, a coating of rubber is extruded around the cord immediately prior to the incorporation of the cord into the reinforcement.

Advantageously, the cord is associated with a green or unvulcanized rubber layer or belt. The reinforcement may be produced by forming the cord in a zigzag pattern over the surface of such a rubber band or belt. Also, a rubber layer may be placed over the outer surface instead of or together with a second rubber layer on the inside. It may be desirable to provide rubber shoulder portions adjacent the edges of the reinforcement either with the cord alone or in combination with one or more rubber layers. The shoulder portions may assist in the positioning of the reinforcement with respect to the carcass so that the edges will be properly disposed in the final tire in relation to the center portion. Also, the shoulder portions may help to minimize the possibility of air entrapment during molding. Such shoulder portions are particularly useful in the production of tires in which it is desirable that the reinforcement be disposed equidistant from the tread surface at all points across the width thereof.

While the above description has been directed primarily to an endless reinforcement breaker for pneumatic tires it will be apparent that the present invention may be utilized to provide reinforcements with various layered constructions with the same or different dimensions or constructions in individual layers. Also, the present invention is useful for the production of other cord components of a tire, for example, for the carcass itself or for a unitized breaker/carcass assembly. The reinforcement can be wound over a carcass or applied thereto in flat band form and expanded, e.g., to produce a belted bias-ply tire or wound over or applied to an expanded carcass such as in the production of a radial ply tire. Furthermore, the reinforcement can be used with a tire from which the tread has been removed, new tread stock applied and vulcanized to form a retread tire.

The invention will be illustrated further with reference to the accompanying drawings in which:

FIG. 1 is a fragmentary view of one embodiment of an endless reinforcement of the invention, FIG. 2 is a fragmentary view of another embodiment of an endless reinforcement of the invention, FIG. 3 is a fragmentary schematic view of a tire including an endless reinforcement of the invention, and FIG. 4 is a schematic illustration of one form of apparatus for forming an endless reinforcement of the invention.

Portions of typical endless reinforcements in accordance with the invention are shown in FIGS. 1 and 2 of the drawings. The reinforcement illustrated in FIG. 1 is similar to the one shown in FIG. 2 except that the number of interleaving lines is increased from 5 to 13. The angle of the cord in each case is approximately 60° and the width is approximately 7 inches. However, it will be seen that the number of interleaving lines is changed considerably from one reinforcement to the other. As shown in the figures, cord is positioned on a green rubber belt 10 with cord length 11 interleaved with cord lengths 12 to form an interleaving line or zone 13. The reversal points 14 at the edges of the reinforcement are also clearly seen from these figures.

In FIG. 3 showing a tire including a reinforcement of the invention, the reinforcement 21 is disposed within the carcass between the tread 22 and the carcass plies 23. It will be noted that the angle of the cords in the reinforcement 21 is considerably smaller than the cord angle in the reinforcement shown in FIGS. 1 and 2, as the angle is measured from an edge.

As shown in FIG. 4, one form of apparatus for forming a reinforcement of the invention includes a rotatable winding drum 31 having a generally cylindrical outer surface 32 providing a supporting surface for tire cord to be positioned thereon. Associated with the drum 31 is a cord guide means 33 mounted for movement on rod 34 for laying cord 30 in a desired zigzag pattern on drum surface 32. Drum 31 and cord guide means 33 are driven by a power source shown as motor 35. Motor 35 is drivingly connected through a belt and pulley arrangement 36 to a rotatable shaft 37. Shaft 37 is connected to a gear box 38 including shaft 39. One end of shaft 39 is associated with barrel cam 40 and the opposite end through a suitable gear train 41 to shaft 42 for drum 31. A cam follower 43 connected to the cord guide 33 engages a groove 40a in the surface of cam 40. Groove 40a is of such a configuration that during rotation of the winding drum 31, cord guide 33 reciprocates across drum surface transversely to the direction of rotation so that cord is laid in a zigzag pattern over surface 32.

Gear train 41 includes a combination of gears to control the positioning of the cord on drum surface 32 during the subsequent rotation of the drum 31 so the cord being laid on the surface is in predetermined position with respect to other cord lengths. This control of the cord lay-down provides for the achievement of the desired cord pattern in the reinforcement and provides for the formation of a complete reinforcement, i.e., a strip in which the cord spacing and configuration is substantially uniform and in accordance with the pre-selected pattern.

Gear box 38 through shaft 39 drives gear 52 which engages differential adder 54. One side of differential adder 54 is connected to gear 56 through shaft 57. Gear 56 engages gear 58 mounted on shaft 42. The other side of differential adder 54 is connected to gear 61 through shaft 62. Gear 61 engages gear 63 on shaft 64. Also mounted on shaft 64 is gear 66 which engages gear 67. Gear 67 is mounted on shaft 68 which is operatively connected to shaft 42 through idler gears 69 and 70.

A further feature of the present invention is the derivation of an exact gear ratio for a reinforcement of given parameters. Solution of the above equation advantageously provides a gear ratio which is an integer plus a fraction, although a decimal gear ratio may be utilized provided the interpolation error is not great. Through the proper selection of gears in gear train 41, it is possible to select one combination of gears to provide the integer of a gear ratio and the other gears to provide the fraction of the gear ratio. In this way the exact desired gear ratio can be achieved without interpolation. For example, as shown in FIG. 4 for a gear ratio of 3 and 73/81 gear 58 would have three times the number of teeth as gear 56 to provide the integer 3. Similarly, the product of the number of teeth in gears 63 and 67 divided by the product of the number of teeth in gears 61 and 66 provides the fraction seventy-three eighty-firsts. The combination of gears 56, 68, 61, 63, 66 and 67 in gear train 41 as shown in FIG. 4 will result in the exact gear ratio of 3+73/81. In a similar way, the gear ratio can be changed through the substitution of gears having different number of teeth.

In a preferred procedure for forming a reinforcement the invention employing the apparatus shown in FIG. 4, winding drum 31 is continuously rotated to draw a length of rubber coated tire cord 30 which has been coated with unvulcanized green rubber at an extruder (not shown), over a guide 44, through cord guide 33 and onto drum surface 32. Simultaneously, the guide 33 reciprocates with respect to the surface of the drum 31 to lay the cord in a zigzag pattern on the surface thereof. As cord guide 33 approaches an edge of the drum surface, the movement of the guide is reversed by the cam 40 so as to provide a reversal of the cord pattern across the surface 32 in an opposite direction. The winding of the cord on the surface is continued until the surface is substantially covered.

The relationship of the speed of rotation of the drum 31 with respect to the movement of cord guide means 33 determines the extent of interleaving of the cords to form the interleaving line or lines which are substantially parallel to and intermediate the edges.

In the determination of a gear ratio for the production of a particular endless reinforcement in accordance with the invention, one approach to the solution of the equation above is to select a particular circumference for the winding drum to be used and to pre-select the width, cord angle and spacing each within specified tolerances. The width tolerance generally is about plus or minus one-eighth inch, the cord angle plus or minus three-tenths degree and the cord spacing plus or minus one or two-tenths end per inch. Using this information together with the desired value for P, the above equation is solved by an iterative procedure which advantageously is performed on a digital computer.

In one procedure, the minimum value of the integer portion of the gear ratio is first determined. This may be accomplished by utilizing minimum values of C and A and a maximum value of W in the following portion of the above formula wherein $$GR = C \cdot \mathrm{Tan}\, A/2 \cdot W$$

and retaining only the integer portion of $GR$. The maximum value of the integer portion of the gear ratio is obtained by substituting in the above formula maximum values of $C$ and $A$ and the minimum value of $W$ and retaining only the integer portion of $GR$. During the iterative procedure, the value of the integer portion of the gear ratio is varied from its minimum to its maximum in steps of one.

The value of $A$, or some other selected parameter, likewise is varied from its minimum to its maximum in a finite number of steps, for example, 0.05°. The minimum and maximum values of the number of circumferences ($X$) in the completed reinforcement is calculated by substituting the minimum and maximum values of $W$ and $EPI$ in the following:

$$X = 2 \cdot W \cdot EPI \cdot \mathrm{Cos}\, A$$

The value of $X$ is varied from its minimum to its maximum in steps of one in the iterative procedure.

The values of $D$ and $M$ to satisfy the above equation are determined from the various values of $A$, $X$ and the integer portion of the gear ratio. When values for $M$, $D$ and $X$ have been determined to satisfy the above equation for a particular integer of the gear ratio, the value of the gear ratio can be calculated. Once the gear ratio has been calculated, the values of $W$ and $EPI$ are finalized. Since a digital computer can perform these calculations and accomplish the iterative procedure very quickly, the computer can find all solutions which exist for a particular value of $P$ within the pre-selected tolerances rather than only one.

Thus, with a reinforcement according to the invention, the circumference, width, cord angle and end spacing each can be selected within close tolerances and still achieve an endless reinforcement with the desired degree of interleaving between the cord lengths. With reinforcement configurations heretofore known, the achievement of a reinforcement with a preselected interleaving pattern could not be predicted nor attained without extensive trial and error belt building.

The invention will be described in greater detail with reference to the following examples which are intended to illustrate the invention without restricting the scope thereof.

EXAMPLE I

A reinforcement for a "70 series" 14 inch tire is made on an apparatus as shown in FIG. 4 employing the following procedure. The circumference of the reinforcement is 47.80 inches and the width thereof is 10.71 inches. The angle of the cord is 54°. A belt having 13 interleaving lines as shown in FIG. 2 of the drawings is formed by winding a rubber coated fiber glass cord of about 0.02 inches diameter, 197 revolutions of the drum with 3 + 14/197 cycles of the cord guide per drum revolution, one cycle being a return to the original edge. The end count of the resulting strip is 15.64 cords per inch measured perpendicular to the cords.

The endless reinforcement strip is applied to a flat band tire carcass and tread and sidewall-forming rubber stock is placed over the breaker strip. The flat band assembly is shaped in the form of a torus under heat and pressure and vulcanized to form a "70 series" 14 inch tire. During the shaping process the circumference of the strip is increased to about 74 inches and the width thereof reduced to about 5½ inches. The cord angle is about 24° as measured from an edge of the strip.

EXAMPLE II

To produce a belt which will provide the same final angle and physical configuration as that in the tire of Example I but for a slightly larger tire, the procedure is similar to that of Example I except as follows:

The angle of the cord is 55°, and the width is 10.62 inches. A belt having 13 interleaving lines similar to that shown in FIG. 2 is formed after 191 drum revolutions with 3 + 41/191 cycles of the cord guide per revolution. The end count of the reinforcement is 15.68 cords per inch. The cord angle in the final tire is the same as that in the tire of Example I and the belt has the same physical appearance.

EXAMPLE III

To produce a belt for a tire slightly larger than that of Example II but with the same physical configuration as the belts of Examples I and II the procedure is the same as that of Example I except as follows:

The cord angle is 56°, the width is 11.03 inches and the end count is 16.30 cords per inch. After 201 drum revolutions with 3 + 43/201 cycles of the cord guide per revolution, a belt having 13 interleaving lines similar to these of Examples I and II is formed. In the final tire, the belt has the same physical appearance as that of Examples I and II.

EXAMPLE IV

To produce a belt with a physical configuration in the final tire similar to that of the previous examples but for a "70 series" 15 inch tire rather than a 14 inch tire as in the previous examples, the procedure is the same as that of Example I except as follows:

The circumference of the belt is 50.90 inches, the cord angle is 55.5°, the width is 11.03 inches and the end count is 15.92 cords per inch. A belt having 13 interleaving lines similar to that of the previous examples is formed after 199 drum revolutions with a gear ratio of 3 + 71/199 cycles of the cord guide per revolution. In the final tire, the cord angle and physical appearance is the same as that of the previous examples.

EXAMPLE V

The procedure of this example is the same as that of Example I except that a belt with 5 interleaving lines similar to that shown in FIG. 1 is formed after 191 drum revolutions with a gear ratio of 3 + 32/191 cycles per cord guide per revolution. The cord angle is 54.05°, the width is 10.40 inches and the end count is 15.63 cords per inch.

EXAMPLE VI

To produce a belt for a tire slightly larger than that of Example V but with the same physical appearance in the final tire, the procedure is the same as that of Example V except as follows:

The cord angle is 55°, the width is 10.78 inches and the end count is 15.60 cords per inch. After 193 drum revolutions with 3 + 32/193 cycles of the cord guide per revolution, a belt similar in appearance to that of Example V with 5 interleaving lines is produced. In the final tire, the belt has the same physical configuration and cord angle as that of Example V.

EXAMPLE VII

To produce a belt for a tire slightly larger than that of Example VI but with the same physical configuration, the procedure is the same as that of Example VI except as follows:

The cord angle is 56°, the width is 11.19 inches and the end count is 16.23 cords per inch. After 203 drum revolutions with a gear ratio of 3 + 34/203 cycles of the cord guide per revolution, a belt is produced similar to that of Examples V and VI with 5 interleaving lines. In the final tire, the belt has the same physical appearance as that of Examples V and VI.

EXAMPLE VIII

To produce a belt with the same physical configuration and dimensions as that of Example VII but with one less interleaving line, namely, four instead of five, a gear ratio of 3 + 40/201 is employed. After 201 drum revolutions, a belt having the same circumference, angle, end count and approximately the same width (11.08 inches) is produced but the physical configuration is substantially different in that the number of interleaving lines is reduced from five to four.

EXAMPLE IX

To produce a belt with substantially the same dimensions and appearance as the belts of Examples VII and VIII but with 6 interleaving lines, the procedure is the same as Example VII except as follows:

The gear ratio is 3 + 29/204. After 204 drum revolutions, a belt having the same circumference and cord angle as that of Examples VII and VIII and substantially the same width (11.28 inches) and end count (16.18 cords per inch) is produced. While the dimensions of the belt are substantially the same as those of Examples VII and VIII, the physical configuration is significantly different since the number of interleaving lines is 6.

The above description, drawings and examples show that the present invention provides a novel reinforcement for a pneumatic tire which has advantages over bias-cut fabric reinforcements and the endless cord reinforcements heretofore known. Moreover, the present invention provides a simple and direct means for producing a particular reinforcement configuration in different sizes with a high degree of reproducibility and without resorting to trial and error belt building. The reinforcement of the invention provides a high degree of flexibility in the configuration and dimensions which can be employed. Thus, the cord angle as well as the width, circumference and/or end count can be pre-selected within close tolerances and still achieve a reinforcement which can be used in a particular tire size. Furthermore, the reinforcement of the invention is useful both for new tires and for retread tires. For new tires the reinforcement of the invention not only is useful in radial-type tires where the reinforcement is applied after the carcass is shaped into the form of a torus, but also the strip is particularly suitable for use in tires made by flat band building methods in which the reinforcement is applied to the carcass in flat band form and expanded during the carcass-shaping procedure. A further advantage of the reinforcement of the invention is the high degree of balance and symmetry which can be achieved in tires incorporating the reinforcement. This is due to the fact that the reinforcement is without a splice and also that the reinforcement does not contain separate plies which can create shear planes and transverse forces or side-thrust in a running tire.

It will be apparent to one skilled in the art that various modifications and variations in the procedures, materials and apparatus can be made within the scope of the invention. For example, with the apparatus shown and described the cord is wound on the outside of the drum surface, however, it may be advantageous under certain circumstances to form the strip in a different manner, e.g., the cord might be positioned on the inside of a drum rather than the outside thereof or wound in a toroidal or cylindrical configuration. Also, it will be understood that while a single reinforcement generally will replace a conventional two-ply breaker strip, more than one reinforcement or a reinforcement with extra thicknesses may be advantageous in certain applications. Therefore, the foregoing description, drawings and examples are intended to illustrate preferred embodiments of the invention, and the scope of the invention is to be limited only by the following claims.

I claim:

1. A method of making a pneumatic tire including the steps of applying an endless reinforcement strip to a tire carcass, applying tread-forming rubber over said strip and carcass, and vulcanizing said tire; said strip comprising continuous cord forming a generally zigzag pattern and being positioned edge to edge across the width of said strip from one side to the other at an angle to the edges of said strip with reversals at the edges, and lengths of said cord between reversals being interleaved with lengths disposed at an opposite angle along at least one line substantially parallel to and intermediate the edges of said strip, the parameters of said strip being $$\frac{C \cdot \tan A}{2 \cdot W} = \frac{EPI \cdot C \cdot D \cdot \sin A}{P \cdot M \pm 1} = GR$$

wherein $C$ is the circumference of the reinforcement, $A$ is the smaller angle between the cord and the edge of the reinforcement, $W$ is the width of the reinforcement measured perpendicular to the edges, $EPI$ is the number of cords per inch measured perpendicular to the cord lengths, $P$ is an integer and equal to one plus the total number of interleaving lines parallel to and intermediate the edges of the reinforcement, $M$ and $D$ are two integers having no common factor and which render $(P \cdot M \pm 1)/D$ an integer with $D$ being less than $P$, and $D$ and $P$ have no common factor, $GR$ is the number of repeating cycles of the cord from one edge and back to the same edge for each circumference of the reinforcement.

2. A method according to claim 1 wherein said endless reinforcement strip is applied to said tire carcass in flat band form, sidewall and tread-forming green rubber is applied over said carcass and breaker strip assembly and the resulting assembly is shaped into the form of a torus under heat and pressure and simultaneously the circumference of the strip is substantially increased.

3. A method according to claim 2 wherein said tire cord changes position within said strip as the circumference thereof is substantially increased during the shaping step.

4. A pneumatic tire made according to the method of claim 1.

5. A pneumatic tire made according to the method of claim 2.

* * * * *